F. C. THORNLEY.
BELT CONVEYER.
APPLICATION FILED DEC. 13, 1916.

1,251,135.

Patented Dec. 25, 1917.
2 SHEETS—SHEET 1.

Inventor
Fred C. Thornley.
By his Attorneys
Baldwin & Wight

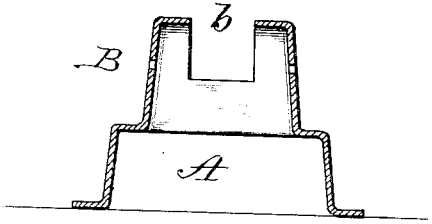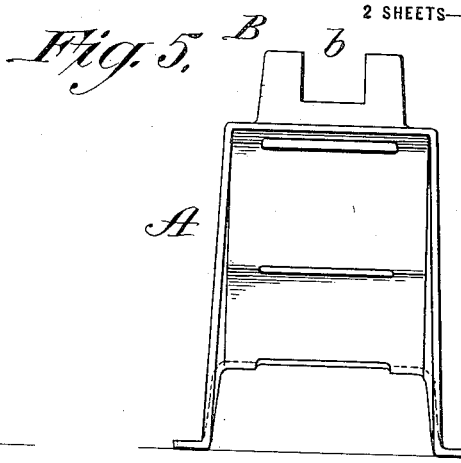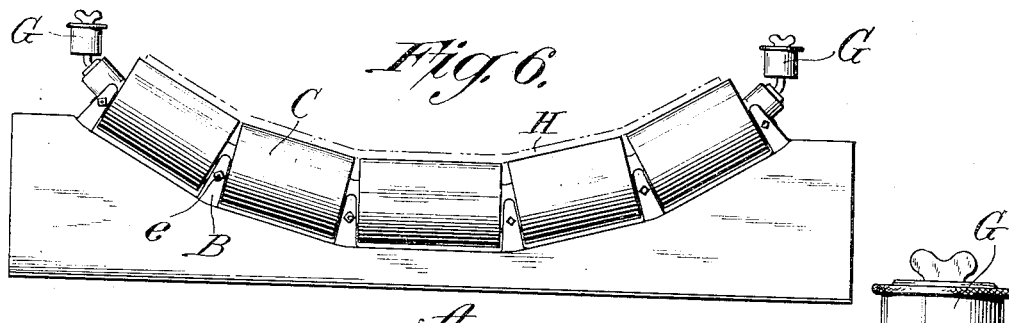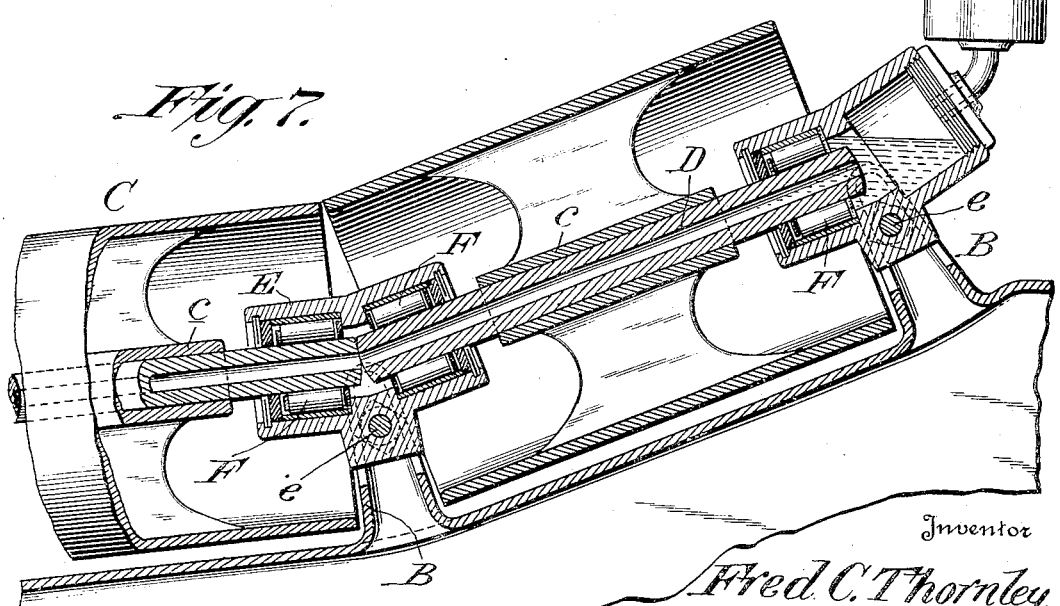

UNITED STATES PATENT OFFICE.

FRED C. THORNLEY, OF BALTIMORE, MARYLAND, ASSIGNOR TO INTERNATIONAL CONVEYOR CORPORATION, OF NEW YORK, N. Y.

BELT CONVEYER.

1,251,135.  Specification of Letters Patent.  Patented Dec. 25, 1917.

Application filed December 13, 1916.  Serial No. 136,607.

*To all whom it may concern:*

Be it known that I, FRED C. THORNLEY, a citizen of the United States, residing in Baltimore, Maryland, have invented certain new and useful Improvements in Belt Conveyers, of which the following is a specification.

This invention relates to belt conveyers of the class in which an endless belt is supported on the under side of its upper run by idler pulleys in such manner as to give to the belt a trough shape to thus better retain the material which the belt conveys.

It is usual in belt conveyers of the class to which my invention relates to provide a series of sets of idler pulleys each set being supported in a frame and to provide means for lubricating the pulleys through their shafts.

The object of my present invention is to provide improved means for supporting the pulleys and novel devices for lubricating them and for otherwise reducing friction.

In carrying out my invention I provide a support for each set of pulleys by stamping out from sheet metal a frame formed with a series of bifurcated brackets adapted to receive housings for the ends of the pulley shafts. Said housings are bolted to the brackets and contain roller bearings for the ends of the shafts which are hollow and abut each other. Lubricating material is supplied through the hollow shafts to the bearings from suitable cups or reservoirs at the opposite ends of the shafts.

In the accompanying drawings:

Fig. 4 shows a transverse section on the line 4—4 of Fig. 2.

Fig. 5 shows an end elevation of the frame.

Fig. 6 shows how the idler pulleys are mounted in the frame.

Fig. 7 is a view on an enlarged scale, mainly in section, showing more clearly the bearings of the pulley shafts and the devices employed for lubricating them.

Figure 1:
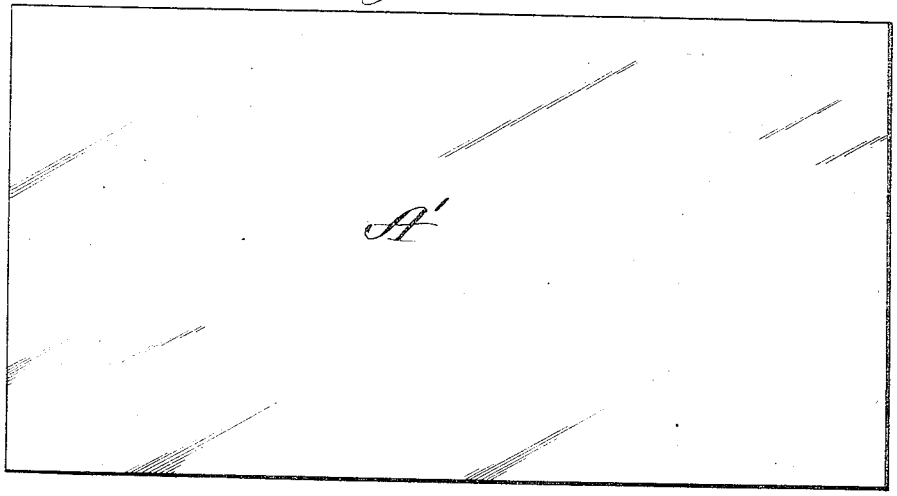
Figure 1 is a plan view of a piece of sheet metal from which the supporting frame may be stamped.
Figure 2:
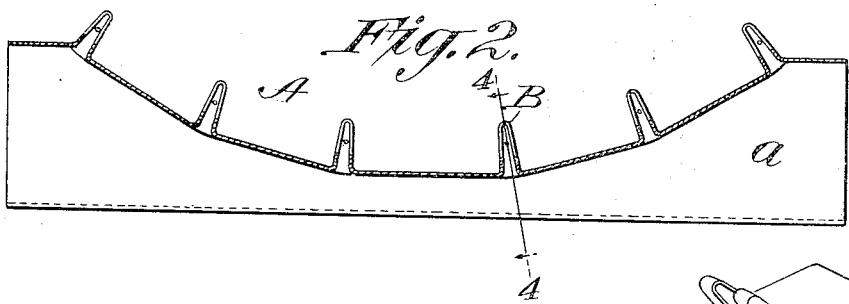
Fig. 2 shows a longitudinal section through the frame.
Figure 3:
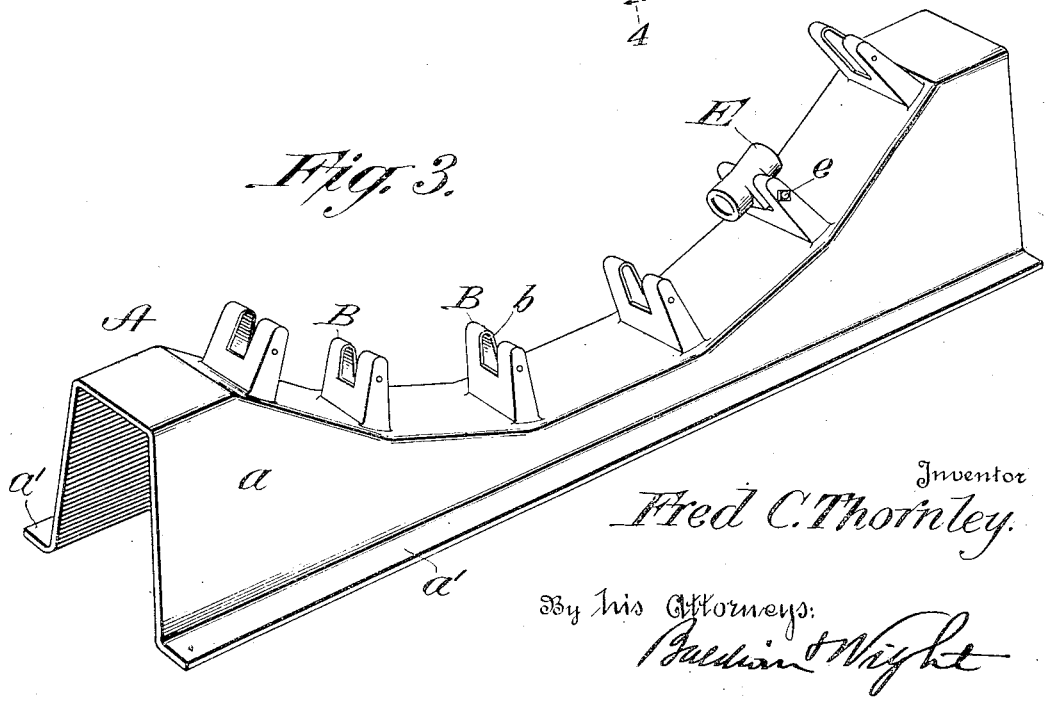
Fig. 3 is a perspective view thereof.

The supporting frame A is made from a single piece of sheet metal A'. This may be accomplished by well known methods of stamping and metal drawing.

The frame A comprises a body portion $a$, U-shape in cross section and having bottom flanges $a'$.

The bottom flanges are parallel and in the same horizontal plane. The sides of the frame are substantially parallel or slightly inclined while the top is curved, the end portions of the frame being considerably higher than the middle portion thereof. On its upper curved portion the frame is formed integrally with a series of brackets B which are hollow and bifurcated as indicated at $b$. The brackets are so disposed as to accommodate between them the several idler pulleys and the housings in which the shafts of the pulleys have their bearings.

Any desired number of pulleys may be used and the number of brackets employed and their size and disposition should correspond with the size and number of the pulleys.

The hub $c$ of each pulley C is attached to a hollow shaft D and each bracket $b$ supports a housing E for the ends of the shafts. The housings, which may be cast, are connected with the brackets by bolts $e$ and each housing contains two chambers each of which is equipped with roller bearings F for the end portions of the shafts D, which latter are rounded as shown and abut each other.

Lubricating material is supplied from cups or reservoirs G at opposite ends of the support and the lubricant passes through the hollow shafts into the chambers of the housing where the ends of the shafts are located and where the roller bearings are mounted.

In this way friction is reduced to a minimum and the shafts are so held as to provide a uniform transverse curve throughout the entire width of the support and thus give the desired trough shape to the belt H which traverses the idler pulleys in the usual way.

I claim as my invention:

1. An idler pulley structure for belt conveyers comprising a supporting frame provided with a series of brackets equipped with roller bearing housings, idler pulleys disposed between the brackets and shafts to which the pulleys are fixed and which have rounded abutting ends within the housings.

2. An idler pulley structure for belt conveyers comprising a supporting frame provided with a series of brackets equipped with roller bearing housings, idler pulleys disposed between the brackets, hollow shafts to which the pulleys are fixed and which have rounded ends in contact with each other within the housings, rollers within the housings by which the end portions of the shafts are supported, and means for supplying lubricating material through the shafts to the abutting ends thereof and to the rollers.

In testimony whereof, I have hereunto subscribed my name.

FRED C. THORNLEY.

Witnesses:
C. ROLLINS ROGERS,
E. H. BAUMANN.